Aug. 29, 1939.   J. M. STRANG   2,171,360
TELESCOPE OBSERVATION INSTRUMENT
Filed June 9, 1937    2 Sheets-Sheet 1

INVENTOR
J. M. STRANG,
BY  E. H. Bond
ATTORNEY.

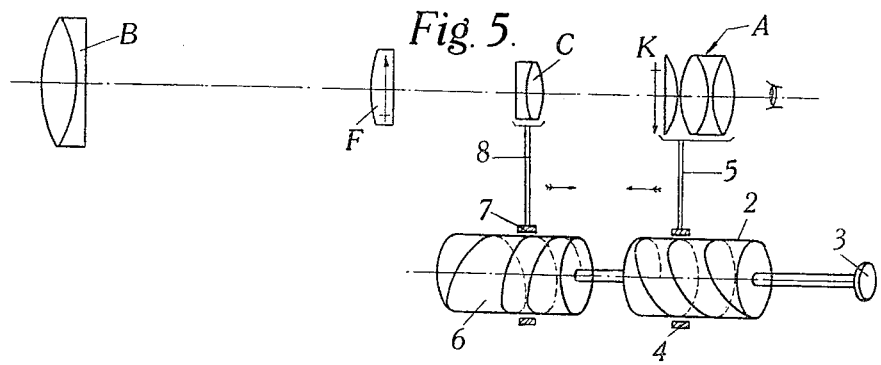
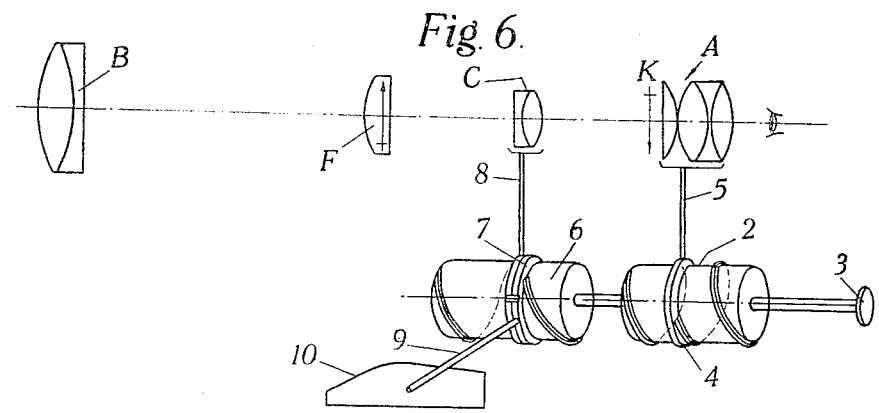
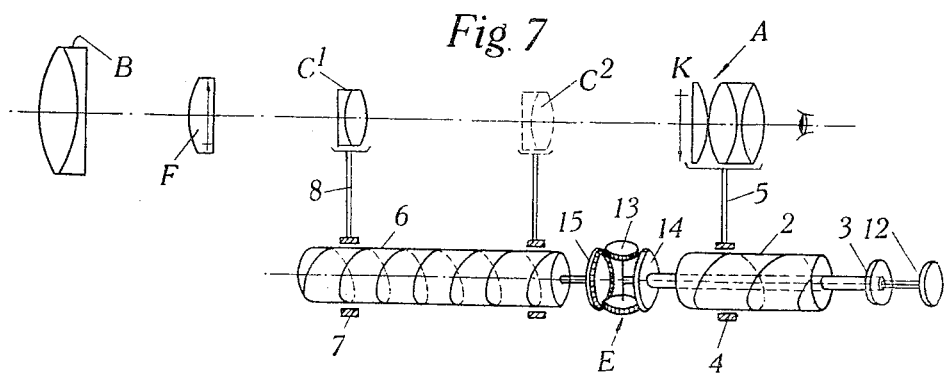
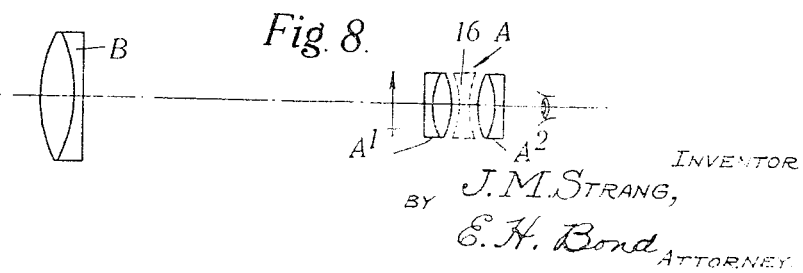

Patented Aug. 29, 1939

2,171,360

UNITED STATES PATENT OFFICE 2,171,360

TELESCOPE OBSERVATION INSTRUMENT

John Martin Strang, Anniesland, Glasgow, Scotland, assignor to Barr and Stroud, Limited, Anniesland, Glasgow, Scotland Application June 9, 1937, Serial No. 147,374
In Great Britain December 20, 1935

1 Claim. (Cl. 88—32)

This invention refers to telescope observation instruments.

Ordinarily, in telescope optical systems, magnification is unintentionally altered by the focussing adjustment. For example, if the telescope is arranged so that it can be focussed to suit different observers by moving the eyepiece to and from the focal plane, such movement will cause a change in magnification. It is frequently of importance, however, that the magnification should remain constant under all conditions of use except so far as provision may be made for effecting a change of magnification under control of the observer. If, for example, in a stereoscopic rangefinder, the magnification of one of the two telescope systems is altered relative to the other an error in the range measurement of the instrument may be caused. It is with alteration of magnification due to focussing adjustment that the present invention is concerned, particularly in connection with telescope systems of stereoscopic rangefinders and heightfinders.

According to this invention, provision is made whereby in the operation of focussing, the magnification is maintained constant or substantially constant.

In carrying the invention into practice, it may be arranged that the movement applied for focussing causes simultaneous movement of two (or more) optical parts (or combinations of parts) along the optical axis, involving also relative movement of these parts, such that the combined movements result in the magnification remaining constant or substantially constant while the focus alters. Alternatively, focussing may be effected by the introduction and withdrawal of an optical part into and from the optical system in such a way that, while the focus is altered, magnification remains constant or substantially so. As a further alternative, the instrument may comprise an optical part or combination which is movable as a whole for focussing and the optical system be so constituted that the focussing optical part in itself maintains the magnification constant or substantially so while effecting focussing.

This invention should be distinguished from variable magnification telescopes in which the magnification can be varied anywhere within wide limits and a sharply focussed image presented to the observer at all magnifications, this being effected by the movement of an optical element which varies the magnification being accompanied by compensating movement of another optical element which maintains the focussing, such telescopes being well known. In instruments according to the present invention movement imparted to the optical system alters the focussing but maintains the magnification constant.

As a first example of the case in which the movement applied for focussing causes simultaneous movement of two optical parts, involving also relative movement of these parts, an optical part or combination is movable as ordinarily for focussing and another optical part or combination, ordinarily stationary, is simultaneously moved so that focussing and correction for change of magnification are effected, and, as another example, an optical combination is movable for focussing and optical members of the combination are relatively movable at the same time, to effect focussing and correction for change of magnification.

As an example of the case in which focussing is effected by the introduction of an optical part into the optical system, a lens, which may be one of a series of lenses provided for the purpose, is introduced between component lenses of an eyepiece combination so that its nodal point coincides with the nodal point of the original combination, when the focus is altered without altering the magnification.

Where a projector lens (or lens combination) is included in the telescope system, the constitution and arrangement of the optical system may be such that by an axial movement of this lens alone the focus may be altered and the magnification kept substantially constant.

In an instrument according to this invention provision may be made for effecting change of magnification of the instrument under control of the observer without alteration of focus.

Some examples of telescope systems in accordance with the invention will now be described with reference to the accompanying drawings which are of a diagrammatic character and in which—

Figure 5 shows a telescope system as in Figure 1 and indicates mechanism for effecting movement of the optical parts.

Figure 6 shows an arrangement substantially the same as that shown in Figure 5, with modified operating mechanism.

Figure 7 shows an arrangement corresponding with that shown in Figure 1 with operating mechanism which includes provision for the observer effecting change of magnification when desired.

Figure 8 shows a fifth example of telescope system.

Figure 1:
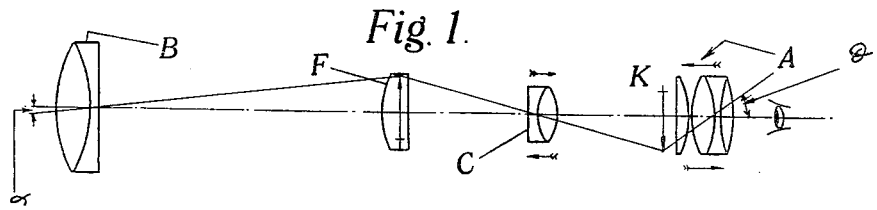
Figures 1, 2, 3 and 4 show four different examples of telescope systems.
Figure 2:
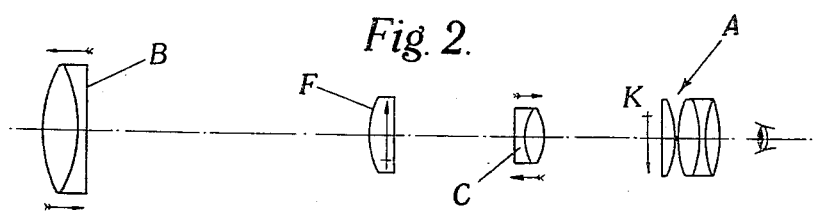

The telescope system shown in Figures 1 and 2 comprises an eyepiece combination A, objective B, and projector lens C. The objective B forms an image of the object under observation at its focal plane F. This image is reproduced by the projector lens C at the position K and is presented to the eyepiece combination A. In Figure 1, the path of an oblique ray which assists in the formation of the image of a point is indicated. This point is situated in a direction making an angle $\alpha$ with the optical axis and it is presented to the eye in a direction making an angle $\theta$ with the axis. The magnification of the system is therefore $\tan\theta/\tan\alpha$. If, however, the distance between the image plane K and the eyepiece combination A is varied by moving the eyepiece A towards or away from the plane K for focussing, the angle $\theta$ is varied correspondingly, and consequently the magnification is varied. In the example according to the invention shown in Figure 1 the eyepiece combination A is movable axially for focussing, a movement ordinarily resulting in variation of magnification, and the projector lens C is moved axially simultaneously and relatively to the eyepiece combination A so that a greater or a less enlarged image is presented at some such position as K to the eyepiece combination A, so as to annul the magnification-changing effect of focussing. In the example shown in Figure 2, it is the objective B which is movable for focussing and the projector lens C is movable simultaneously.

Figure 3:
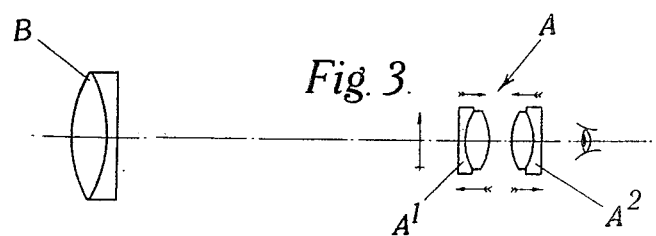

In the example shown in Figure 3, the arrangement is such that in the operation of focussing, which ordinarily would be effected by movement axially of the eyepiece combination A, relative movement axially of the two members $A^1$ and $A^2$ of the eyepiece combination also takes place according to a relationship which keeps the magnification constant or substantially constant while the focus is altered.

Figure 4:
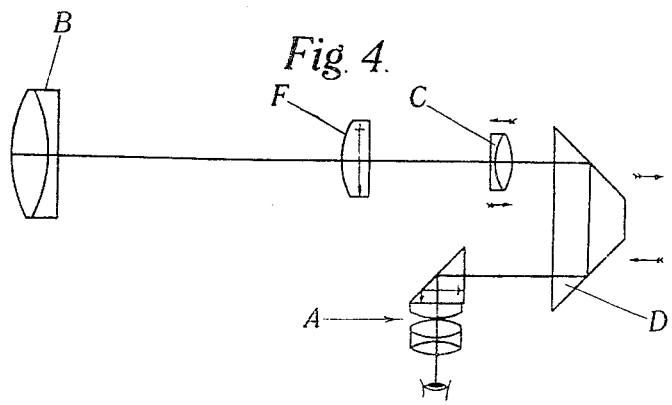

The system shown in Figure 4 is of prismatic character, focussing being effected by movement of the prism D and magnification correction by movement of the projector lens C, as indicated by the arrows.

In the arrangement shown in Figure 5, corresponding with Figure 1, movement of the eyepiece combination is effected by means of a constant lead screw 2 operable by a head 3, a nut 4 in engagement with the screw 2 and a carrier 5 for the combination, and for moving the projector lens C there are provided a variable lead screw 6, directly connected with the screw 2, a nut 7 in engagement with screw 6, and a carrier 8 for the lens C. When the focussing head 3 is turned, the eyepiece combination A and the projector lens C each moves along its screw and simultaneous predetermined relative movement takes place between them such that while the focus is altered the magnification remains unchanged.

In the modification shown in Figure 6, in order to obtain the required relative movement of the projector lens C and eyepiece combination A, the nut 7, instead of being altogether held against rotation as in Figure 5, is engaged through the medium of an arm 9 with a cam track 10 and, in moving axially along its screw 6, predetermined restricted rotational movement of the nut 7 is caused so that departure from the normal motions of the screw 6 is obtained, the movement imparted to the projector lens C being thus dependent upon the lead of the screw 6 and upon the form of the cam track 10.

In the arrangement shown in Figure 7, the projector lens C has two normal positions $C^1$ and $C^2$ so that the telescope has two normal magnifications, and the variable lead screw 6 is extended to give a range of correcting movement to the projector lens corresponding with each normal position of the lens C, to keep the magnification constant at any one value. For effecting change of magnification from one value to another, a differential gear E is inserted between the focussing screw 2 and the variable lead screw 6. A head 12 for effecting change of magnification is connected to the element 13 of the differential, the focussing screw 2 to the element 14 and the variable lead screw 6 to the element 15. By moving the head 12 while the focussing head 3 is held stationary, the projector lens is moved along the screw 6 from one normal position to another. Then, if the head 12 is held and the head 3 is turned, focussing is effected and the projector lens moved for magnification correction.

Figure 8 shows an arrangement in which focussing is effected by the introduction between and withdrawal from between the lenses $A^1$ and $A^2$ of the eyepiece combination A of a lens 16, which may be one of a series of lenses of varying dioptric value provided for that purpose, there being in this case no axial movement of the eyepiece for focussing. If the lens 16 is so inserted that its nodal point coincides with the nodal point of the original combination the focus is altered without altering the magnification.

As a further arrangement, if in the example shown in Figure 1, where the optical system comprises an eyepiece A, objective B, projector lens C and graticule F, the graticule being at the focal plane of B, the eyepiece A is stationary or if in the example shown in Figure 2 the objective B is stationary, the projector lens C only being movable, it may be arranged that by axial movement of the projector lens C alone the focus can be altered and the magnification kept constant or substantially constant. Thus, let—

$u$ be the distance between F and C
$v$ the distance between C and image K
$f$ the focal length of the eyepiece A Then a relationship can be derived between $u$, $v$ and $f$ such that, when the projector lens C alone is moved, focussing at constant magnification results, the relationship being:—

$$fu = (u-v)(v+f)$$

Taking a numerical example on this basis with the following values:

$$u = 4$$
$$v = 3$$
$$f = 1$$

it is found that a focussing adjustment of $\pm 2$ dioptres can be obtained with an error in magnification of only about $\pm 0.3\%$. The corresponding error in the ordinary telescope where the eyepiece moves for focussing and to which this invention has not been applied is about $\pm 5.2\%$.

I claim:

A telescope observation instrument having means for focusing the instrument to suit different observers while maintaining a substantially constant magnification of the object viewed, said instrument comprising an objective, an eye piece, a projector lens therebetween, the objective and projector lens producing an image of the object for presentation to the eye piece, mounting means for adjustably mounting the projector lens in the instrument, and separate supporting means in the instrument for the objective and for the eye piece, one of said separate supporting means being movable with respect to the other, an operating head, actuating means connected to the movable support and operable by said operating head for moving said movable support to vary the distance between the image plane and the eye piece for focusing, a differential gear mechanism operatively connected with said actuating means and with the projector lens mount for simultaneously imparting movement to the projector lens mount relative to the movable support to vary correspondingly the size of the image presented to the eye piece to annul the magnification changing effect of focusing to produce a substantially constant magnification for different focusing adjustments for different observers, and a second operating head connected to the differential gear mechanism for imparting independent movement to the projector lens to change the magnification leaving focusing unchanged.

J. MARTIN STRANG.